United States Patent [19]

Slattery et al.

[11] Patent Number: 4,593,192

[45] Date of Patent: Jun. 3, 1986

[54] ELECTRONIC CIRCUIT MODULE AND HOLDER THEREFOR

[75] Inventors: Peter F. Slattery, Gloucester; William R. Foster; Gavin A. McLintock, both of Ottawa; James K. Fraser, Gloucester, all of Canada

[73] Assignee: Targa Electronics Systems Inc., Ottawa, Canada

[21] Appl. No.: 505,738

[22] Filed: Jun. 20, 1983

[51] Int. Cl.$^4$ .............................................. G01D 5/34
[52] U.S. Cl. ..................................... 250/229; 250/561
[58] Field of Search ..................... 250/229, 221, 222.1, 250/561, 239

[56] References Cited

U.S. PATENT DOCUMENTS 4,250,379 2/1981 Hansen, Jr. ......................... 250/229
4,315,147 2/1982 Harmer ................................ 250/229
4,339,662 7/1982 Basch et al. ........................ 250/229

Primary Examiner—David C. Nelms
Assistant Examiner—Jim Gatto
Attorney, Agent, or Firm—Achmed N. Sadik

[57] ABSTRACT

An electronic circuit module and a compatible module holder are provided which are particularly suitable for magnetic bubble memory applications. The holder has power-down warning and write-protect circuits utilizing light emitting diodes (LEDs) and photo-transistors to detect motion prior to removal of the module, and to detect the presence of a reflective sticker to write enable, respectively. Moreover, the module has separate ground buses for each power supply voltage to prevent circuit damage due to relative polarity reversal in case of ground non-connection upon insertion or removal of the module from the holder.

1 Claim, 5 Drawing Figures

ELECTRONIC CIRCUIT MODULE AND HOLDER THEREFOR

FIELD OF THE INVENTION

The present invention relates to plug-in electronic circuit modules in general, and in particular to a module suited for magnetic domain memory applications. The invention further relates to such module (or cartridge) and a holder therefor.

BACKGROUND OF THE INVENTION

Magnetic domain memory, popularly known as bubble memory, devices are emerging as a rugged means for data storage particularly suited for hostile environments in terms of shock, vibration and the like. Intel Corporation of Cal., U.S.A., manufactures and sells a bubble memory kit designated BPK 72 in order to facilitate use of, and familiarize circuit designers with, the somewhat exotic bubble memories. A "BPK 72 Bubble Memory Prototype Kit User's Manuel" was published by Intel in 1981 (Order Number: 121685-002), which is not only a guide to the user but is generally a good introduction to bubble memories in general. The publication is incorporated herein by reference in its entirety.

Intel's prototype kit BPK 72 was neither intended, nor is it suitable for actual use except in experimental or laboratory applications. In most applications in which bubble memories would prove particularly advantageous, i.e. in hostile environment applications, it would be desirable to have the bubble memory device proper in a removable module. It is then possible to use a plurality of modules as, say, floppy discs or tape cassettes are used by simply plugging them in and out of a holder in the host equipment.

Unlike a floppy disc or tape cassette, the bubble memory, although a medium for permanent storage without power requirements, must not be disconnected at certain critical times during the operational cycle. Furthermore, and partially due to the complex nature of the control requirements of bubble memories, it is necessary to follow certain sequences in powering down, during insertion and removal, and write protect to maintain the integrity of the circuits driving it and information stored in a bubble memory. Only when these peripheral but necessary requirements are fulfilled would a bubble memory module have a wide scope of application in the environment for which it is most suited, namely the hostile environment.

SUMMARY OF THE INVENTION

The electronic circuit module of the present invention satisfies three basic requirements. First, to provide a warning to the circutry before the module is powered down. Second, to provide write protect. And third, to provide circuit protection in case of the dc-ground connecting last.

The warning necessary to the bubble memory circuitry prior to removal of the module, i.e. prior to powering down, is provided by means of a motion detector associated with the locking/ unlocking mechanism of the module. Preferably, a light beam between a source and a receiver in the module holder is interrupted by the unlocking motion. The photo-transistor receiver thus gives a signal indicating that power is being cut off. This is a simple solution using the necessary locking mechanism for modules in harsh environments.

The write enable, if desired in a module, is provided simply by applying a reflective sticker to a suitable spot on the outside surface of the module. The module holder has light source and receiver such that light is reflected from the write-enable sticker onto the photo-transistor receiver. The permanent logical signal generated is the write-enable signal. In absence of a sticker, the photo-transistor yields the complementary logic state indicating write protect.

The problem of the dc-ground connecting last (i.e. after the other power connections) is created because it may result in a wrong polarity voltage being applied to the circuitry without the intermediate, zero voltage, ground. This problem is solved by having separate dc-grounds that are interconnected on the connector receptacle in the module holder.

While the module, and the module holder, of the present invention were developed for, and are particularly suited to, bubble memory applications, they are not limited thereto.

Thus, according to the present invention, an electronic circuit module and compatible module holder are provided comprising means for detecting motion, and thereto responsive means for generating a signal indicating a powering down condition to a circuit in the module.

Preferably, the means for detecting motion comprises a light source and means for interrupting the light path from the source to the means for generating a signal.

According to another aspect of the present invention an electronic circuit module and compatible module holder are provided comprising a region on the module surface having high reflectivity, and a light source and a light receiver in said module holder for projecting light on said region and receiving the reflection therefrom when the module is in the module holder, and said receiver generating a signal indicating a write enable to a circuit in the module.

Preferably, the region of high reflectivity on the module surface is provided by means of a removable sticker or paint.

According to a further aspect of the present invention an electronic circuit module and compatible module holder are provided comprising separate ground buses in the module one each and associated with each one of a plurality of power supply voltages, and the corresponding connectors to said ground buses in the module holder being therein interconnected to provide a single power supply common terminal.

BRIEF DESCRIPTION OF THE DRAWINGS

The preferred embodiment of the present invention will now be described in detail in conjunction with the annexed drawings, in which.

DETAILED DESCRIPTION OF THE PREFERRED EMBODIMENT

Figure 1:
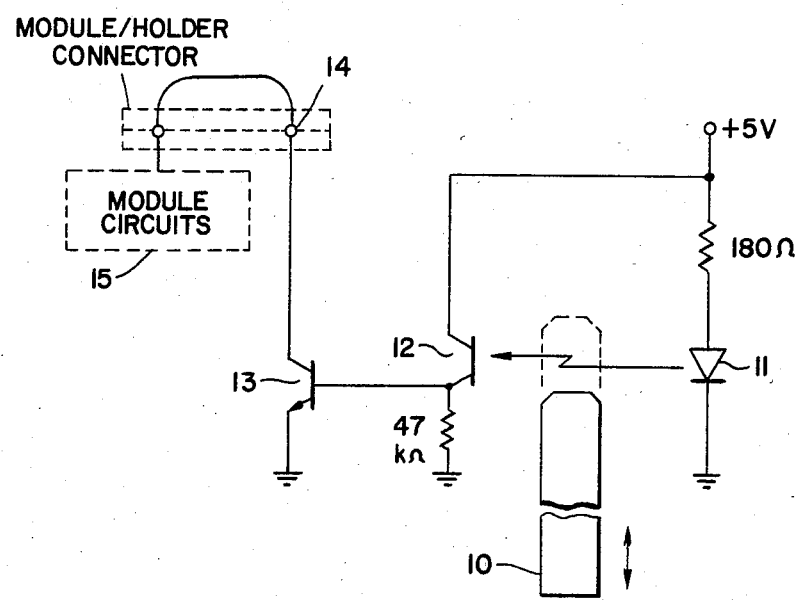
FIG. 1 is a circuit schematic for motion detection in a module holder according to the present invention.

FIG. 1 of the drawings is a schematic of the motion detector, which detects the motion of a spring loaded locking shaft 10, shown in solid outline in its normal position and in dashed outline in the lock/unlock position, where it interrupts the light path from light emitting diode (LED) 11. The light from the LED 11 reaches a photo-transistor 12 causing it to conduct and turn on switching transistor 13, which pulls the voltage at terminal 14 toward ground indicating to the plug in module circuit 15 normal operating conditions.

Figure 2:
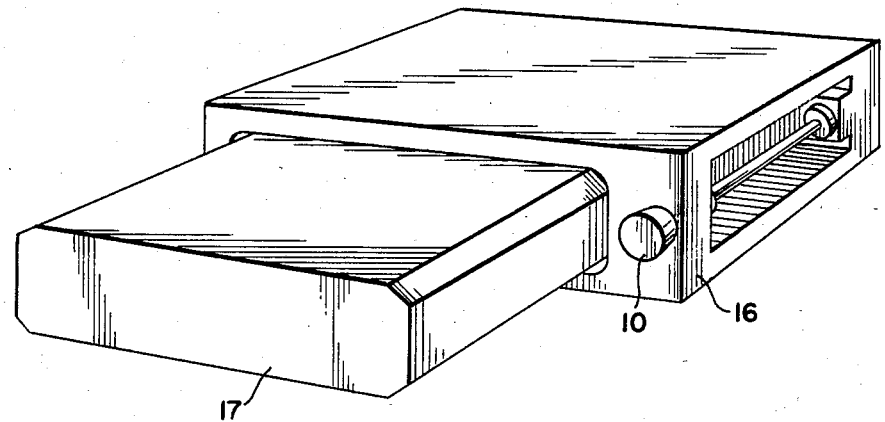
FIG. 2 is a perspective view of a module in a holder having the circuit of FIG. 1.

FIG. 2 shows a module holder 16 having a module 17 plugged therein. The module 17 cannot be removed from its holder 16 as long as spring loaded locking shaft 10 is in the normal position. As the shaft 10 is pushed in, the light path from the source 11 to the receiver 12 is momentarily interrupted. This interruption causes the transistor 13 to switch off momentarily; the impulse edge of the switching off action is interpreted by the module circuit 15 as indicating powering down of the module 17. Note that the motion detected signal, which is generated in the module holder 16, is relayed to the module circuit 15 in the module 17 through the module/holder connector. In terms of the operating cycle of the bubble memory in the module 17, the mechanical action of pushing the shaft 10 to unlock the module 17 is very long. Accordingly, from the moment the light path is interrupted by action of the shaft 10, there are many bubble memory cycles during which the powering down can take place. The details of this process are outside the scope of the present invention.

Figure 3:
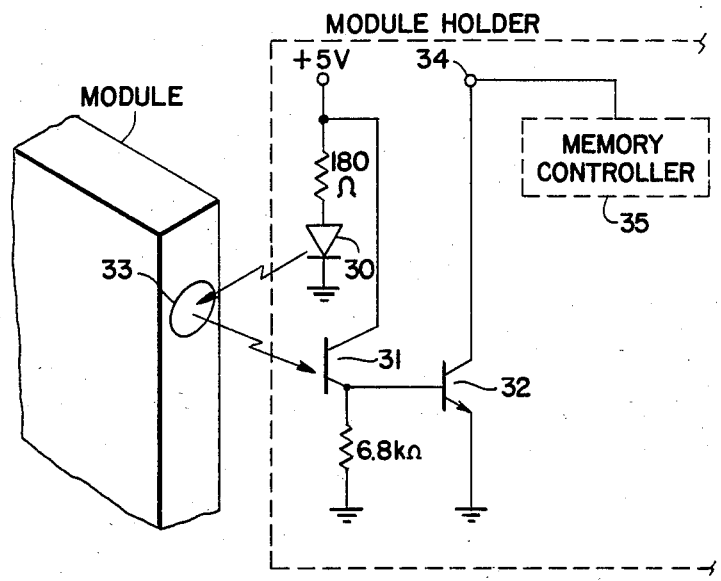
FIG. 3 is a schematic of the write-protect circuit according to the present invention.

Turning now to FIG. 3, the write-protect circuit in the module holder comprises an LED 30, a photo-transistor 31 and a thereby driven switching transistor 32. The LED 30 and the photo-transistor 31 are disposed side by side in the module holder such that the light emitted from the LED 30 does not directly fall on the transistor 31, but only by reflection off the adjacent surface of the module when it is inserted in its proper position. Such reflection takes place only when a reflective sticker 33 is stuck onto the module surface opposite and intermediate the LED 30 and the transistor 31. It is, of course, important that the reflectivity of the module surface without the sticker 33 should be poor compared to that of the surface of the latter. In order to preserve the information stored in any module and prevent accidental or deliberate erasure or writing on, no sticker is affixed at the designated spot. Thus, even though in operation the LED 30 emits light, it is not sufficiently reflected to enable the photo-transistor 31, thereby maintaining the transistor 32 in the off-mode and terminal 34 off ground potential, which is used to disable the memory controller 35 used to write the bubble memory. In order to enable writing operations, the sticker 33 is applied, which reflects the light onto the transistor 31 resulting in a pulling of potential at the terminal 34 toward ground, which is the enable signal. To preserve the information stored in the module, the sticker 33 is simply removed. (Of course, it is possible to do the reverse and have the module surface normally reflective and use an absorbing sticker 33 to yield the write enable signal. This is not recommended, however, for any failure in the LED 30 or the other components could cause loss of information by being interpreted as a write enable signal.)

An advantage of this scheme of write-protect is that the write-enable sticker 33 is apparent on the module surface. Moreover, any accumulated dirt or the like would be interpreted to preserve the stored information.

An advantage of both the power-down and write-protect schemes is the fact that the module holder carries the necessary circuits.

Figure 4:
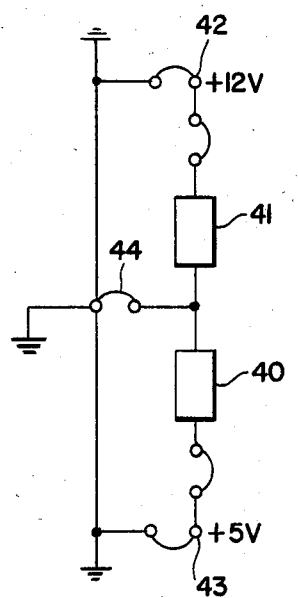
FIG. 4 is a schematic illustrating the problem of ground connecting last solved by the present invention.
Figure 5:
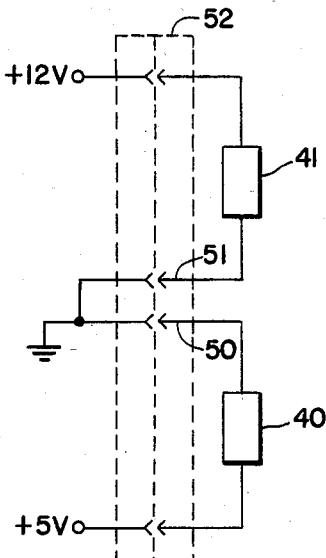
FIG. 5 is a schematic illustrating the solution to the problem illustrated in FIG. 4 according to the present invention.

FIG. 4 illustrates the general condition where a circuit 40 (an integrated circuit, for example) appears effectively in series with a load between two potential terminals 42 and 43, one connected to a supply of +12 V and the other to a supply of +5 V (typically), respectively. Normally, the junction between the circuit 40 and the load 41 is grounded. If the circuits 40 and 41 are in a plug-in module (such as the module 17 in FIG. 2), it is possible that both the terminals 42 and 43, during insertion or removal of the module, connect while the ground connection 44 is not complete. In this case, the circuit 40 would experience a relative reversal of polarity across its terminal, and damage is often the result. With reference to FIG. 5, this problem is obviated by using in the module separate ground busses 50 and 51, which are interconnected at ground only as the module is plugged in by means of a connector 52. Due to the complexity of the drive circuitry of bubble memory devices, but also in many other modules, more than one power supply potential is used. Unless the memory device is permanently wired this problem arises.

What is claimed is:

1. A magnetic bubble memory module and a compatible module holder comprising: a locking rod for locking and unlocking the module in the module holder by inserting and withdrawing said rod, respectively; a light source and therewith aligned light sensor disposed in the module holder on opposite sides of the locking rod such that withdrawal of the locking rod is detected by activation of the light sensor by light from the light source; and signalling means for generating a signal indicating a powering down condition to a circuit in the module in response to activation of the light sensor before the magnetic bubble memory module has been removed from the module holder.

* * * * *